Feb. 3, 1942.  P. A. RAICHE  2,272,069
PUNCH APPARATUS FOR RUBBER ARTICLES
Filed May 29, 1939
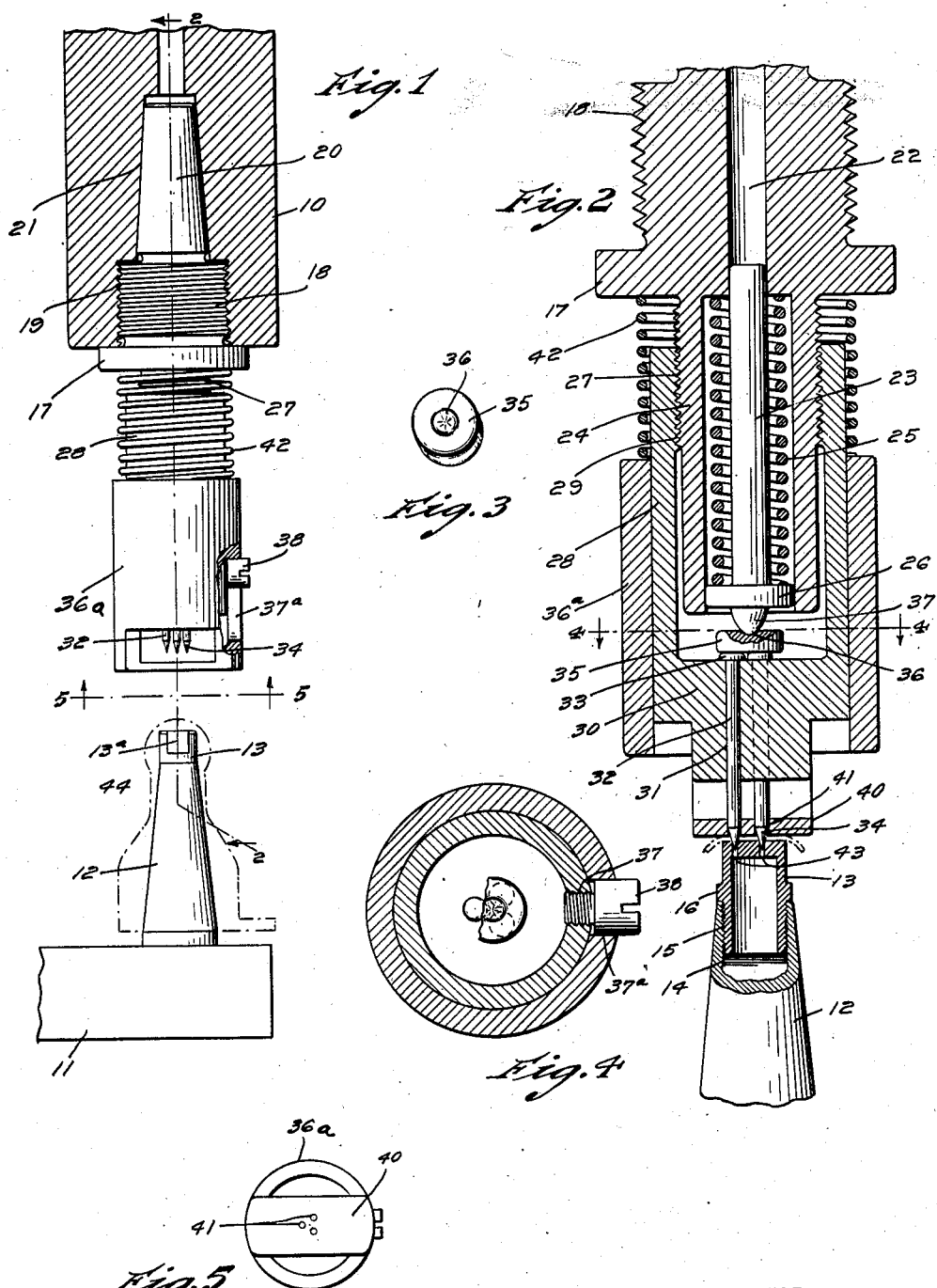
INVENTOR
BY Paul A. Raiche
Nathaniel Frucht
ATTORNEY Patented Feb. 3, 1942

2,272,069

UNITED STATES PATENT OFFICE 2,272,069

PUNCH APPARATUS FOR RUBBER ARTICLES

Paul A. Raiche, Providence, R. I., assignor to Davol Rubber Company, a corporation of Rhode Island Application May 29, 1939, Serial No. 276,349

13 Claims. (Cl. 164—124)

My present invention relates to the manufacture of rubber articles, and has particular reference to apparatus for punching or cutting openings therethrough.

It is the principal object of my invention to provide a novel apparatus for cutting a plurality of openings of predetermined size in a rubber article.

Another object of my invention is to provide an apparatus for producing a plurality of spaced perforations in a rubber article.

It is a further object of my invention to provide an apparatus for cutting a plurality of feed passages of uniform size in a rubber nipple.

With the above and other objects and advantageous features in view, my invention consists of a novel arrangement of parts more fully disclosed in the detailed description following, in conjunction with the accompanying drawing, and more specifically defined in the claims appended thereto.

In the drawing:

Fig. 1 is an elevation, partly in section and partly broken away, showing the novel punch apparatus as used for cutting feed passages in a nipple;

Fig. 2 is an enlarged view, in section, showing the detailed construction of the punch die;

Fig. 3 is a perspective view of the novel equalizer head;

Fig. 4 is a section, partly broken away, on the line 4—4 of Fig. 2; and

Fig. 5 is an end view on the line 5—5 of Fig. 1.

The manufacture of rubber articles having perforations of predetermined size, such as for example nipples provided with feed passages, requires punching of the rubber article so as to obtain a plurality of spaced perforations of uniform size. Since the rubber varies in thickness and in resilience, and it is difficult to provide precision tools which do not have dimensional variations and which do not appreciably wear, it has been found desirable to provide an apparatus which automatically compensates for inequalities of the rubber to be punched and for slight variations in size of the punching tools. It has also been found desirable to provide a punching apparatus which has extremely long life, and in which the parts subject to wear are readily replaceable at small cost. To this end, I have devised an apparatus which includes a multiple power punch and a fixed die for cooperating with the multiple punch, the parts being so arranged as to equalize the punching stroke and pressure, whereby a plurality of uniform perforations are attained.

Referring to the drawing, the novel punching die may be applied to any standard type of punch press, the movable punch head of such a press being indicated as 10 in Fig. 1, and the corresponding base for receiving the die being designated 11. The die itself may be made of any suitable shape and size to accommodate the articles to be punched, and as illustrated includes a hollow support standard 12 and a replaceable head 13, see Fig. 2, the standard 12 being internally threaded at the upper end 14 and the lower end 15 of the head being correspondingly threaded to seat therein, and being formed with an annular collar 16 to limit setting the head in fixed relation to its support standard 12.

The punch includes a tool holder 17 with a threaded portion 18 adapted to seat in a correspondingly threaded bore 19 of the punch head 10, and a tapered shank 20 for seating in a correspondingly tapered bore 21 of the punch head. The holder 17, see Fig. 2, has a central cylindrical bore 22 for slidably receiving a push rod 23 and has a depending cylindrical hub 24 concentric with the rod 23 and forming a housing for a heavy spiral spring 25 which exerts a powerful resilient pressure on the push rod 23 by engagement with a collar 26 formed on the lower end of rod 23. The periphery of the collar 26 is preferably designed to have a snug sliding fit within the interior surface of the hub 24, to provide a guide for the punching movement of the push rod 23.

The depending hub 24 is externally threaded at its upper end, as indicated at 27, and a generally cylindrical housing 28 is provided which is internally threaded as indicated at 29 for removable attachment to the depending hub 24, the housing 28 having an elongated recessed base portion 30 which is provided with a plurality of elongated spaced guide passages 31 each adapted to receive a punch pin 32, each punch pin 32 having an enlarged head 33 and a conical punching end 34, the preferred angle for the conical end being about 40°. As best shown in Fig. 2, the heads 33 of the punch pins 32 are of uniform thickness so as to provide a smooth bearing for the flat lower portion of an equalizer or balancing rocker head 35, which has an upper central conical recess or depression 36 for receiving the conical or pointed end 37 of the push rod 23. A ball and socket joint may be used, but the conical form of universal joint is preferred.

A spreader device 36ª of cylindrical form is preferably seated about the housing 28, and has a vertical guide slot 37ª for slidably receiving the outer end 38 of a stud which is threadedly secured in a bore 37 in the housing 28, the lower end of the spreader being formed as a flat cutout base 40 provided with a plurality of openings 41 in alignment with the punch pins 32, and the upper end of the spreader being urged downwardly towards the die head 13 by a helical spring 42.

The die head 13, see Fig. 2, is provided with a plurality of passages 43 in alignment with the punch pins 32, of uniform size, and in accord with the desired diameter of the perforation to be made in the rubber article.

As above described, the novel punch and die includes a small number of readily manufactured and readily assembled parts, the punch pins and balancing head being positioned in the housing 28 and then assembled to the depending hub 24 in which the rod 23 and its spring 25 have been previously positioned. The spreader spring is then inserted over the housing 28 and the spreader mounted on the housing 28 by threading the stud 38 therein through the slot 37 into the threaded cavity 39. The heavy spiral spring 25 is tensioned by threading the housing 28 on the depending flange 24 so as to provide a regulated resilient punch stroke. The die head 13 is then mounted in its supporting standard 12 and turned so as to bring its openings 43 in exact alignment with the punch pins 32, this turning being facilitated by providing parallel flat faces 13ª on opposite sides of the die head 13.

The punching operation may now be explained. The punch and die being in proper assembled relation, a nipple such as indicated in dotted lines in Fig. 1 is positioned over the support standard 12 and the die head 13, and the punch head 10 is actuated in the customary manner to force the punch downwardly. The spreader 36ª contacts the upper portion of the nipple first, and flattens it as shown in Fig. 2, and the three punch pins 32 then punch downwardly under the resilient action of the spring 25 to force the conical ends 34 of the punch pins into contact with the sharp upper edges of the passages 43. The conical ends of the punch pins 34 thus initially penetrate through the top of the nipple, or stretch the rubber, to permit engagement of the conical surfaces of the punch pin ends with the sharp edges of the die passages to neatly and cleanly punch the rubber. The punched-out rubber discs contract to a diameter slightly smaller than the passage diameter, and thus drop out from below. Any slight differences in the length of the punch pins 31, or in their downward movement due to wear, is compensated for by the equalizing head, which positively assures sufficient downward movement of each punch pin until its head 34 has contacted the sharp upper edge of its passageway 43. The wear which normally occurs on the conical head 34 of the punch pins is thus fully compensated for; the die heads 13, which are extremely hard, do not appreciably wear, and are readily replaceable; the life of the above described punch and die arrangement has been found to be extremely long.

While I have described a specific punch and die construction suitable for punching spaced perforations in nipples, it is obvious that the apparatus may be redesigned for punching spaced perforations in other rubber articles, such as for example finger cots and the like, and may be changed to punch any type of openings or slits in rubber articles, without departing from the spirit and the scope of the present invention as defined in the appended claims.

I claim:

1. In combination, a die having a plurality of spaced passageways, and a punch having a plurality of separate punch elements aligned with said passageways, said passageways having sharp edges and said punch elements having conical points adapted to engage said passageway edges, and means for equalizing the stroke and the pressure of said punch elements.

2. In combination, a die having a plurality of spaced passageways, and a punch having a plurality of separate punch elements aligned with said passageways, said passageways being cylindrical and having sharp edges and said punch elements having conical points adapted to engage said passageway edges, and means for equalizing the stroke and the pressure of said punch elements.

3. In combination, a die having a plurality of spaced passageways, and a punch having a plurality of separate punch elements aligned with said passageways, and means comprising a punch member and an equalizing device actuated by said punch member and simultaneously engaging each of said punch elements for equalizing the stroke and the pressure of said punch elements.

4. In combination, a die having a plurality of spaced passageways, and a punch having a plurality of separate punch elements aligned with said passageways, and means comprising a spring-pressed punch member and an equalizing device actuated by said punch member and operatively engaging said punch elements for equalizing the stroke and the pressure of said punch elements.

5. A punch comprising a block, a punch rod slidably mounted therein, a compression spring actuatable by said block and engaging said punch rod, punch elements slidably mounted in said block, and an equalizer device engaged by said punch rod and engaging each of said punch elements.

6. A punch comprising a block, a punch rod slidably mounted therein, a compression spring actuatable by said block and engaging said punch rod, punch elements slidably mounted in said block, and an equalizer device having a universal connection with said punch rod and engaging each of said punch elements.

7. A punch comprising a block, a punch rod slidably mounted therein, a compression spring actuatable by said block and engaging said punch rod, punch elements slidably mounted in said block, and an equalizer device having a ball and socket connection with said punch rod and engaging each of said punch elements.

8. A punch comprising a block, a punch rod slidably mounted therein, a compression spring actuatable by said block and engaging said punch rod, punch elements slidably mounted in said block, said rod having a conical end, and an equalizer device having a conical cavity for receiving the conical end of said punch rod and engaging each of said punch elements.

9. A punch comprising a block, a punch rod slidably mounted therein, a compression spring actuatable by said block and engaging said punch rod, punch elements slidably mounted in said block, said rod having a rounded end, and an equalizer device having a rounded cavity for receiving the rounded end of said punch rod and engaging each of said punch elements.

10. In combination, a die having a plurality of spaced passageways, and a punch having a plurality of separate punch elements aligned with said passageways, means comprising a spring-pressed punch member and an equalizing device actuated by said punch member and operatively engaging said punch elements for equalizing the stroke and the pressure of said punch elements, and a spring-pressed spreader movably mounted on said punch for engaging the work prior to engagement of the punch elements therewith.

11. In combination, a die having a plurality of spaced parallel passageways, and a punch having a plurality of separate punch elements aligned with said passageways, actuating mechanism for said punch, and rocker means engaged by said actuating mechanism and engaging said punch elements for equalizing the stroke and the pressure of said punch elements.

12. In combination, a die having a plurality of spaced openings, a punch arrangement comprising a punch actuating member and having a plurality of spaced passages in alignment with the die openings, independent punch elements positioned in said passages, and equalizing means positioned to be engaged by said punch actuating member and to simultaneously engage the punch elements for equalizing the stroke and pressure of said punch elements.

13. In combination, a die having a plurality of spaced openings, a punch arrangement comprising a spring-pressed punch actuating member and having a plurality of spaced passages in alignment with the die openings, independent punch elements positioned in said passages, and equalizing means positioned to be engaged by said punch actuating member and to simultaneously engage the punch elements for equalizing the stroke and pressure thereof.

PAUL A. RAICHE.